Figure 1:
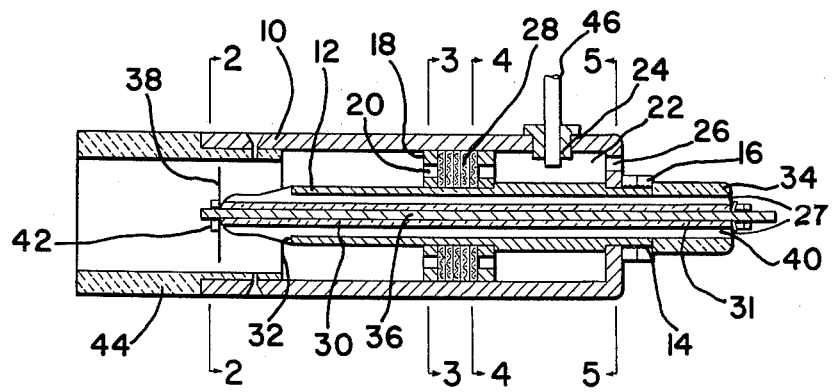

Jan. 1, 1963  J. K. DELANO  3,071,182
COMPACT FUEL BURNER WITH ELECTRIC IGNITION MEANS
Filed Feb. 3, 1960  2 Sheets-Sheet 1

*INVENTOR.*
JAMES K. DELANO
BY Alfred E. Miller
ATTORNEY

Jan. 1, 1963                J. K. DELANO                3,071,182
COMPACT FUEL BURNER WITH ELECTRIC IGNITION MEANS
Filed Feb. 3, 1960                                    2 Sheets-Sheet 2

INVENTOR.
JAMES K. DELANO
BY Alfred E. Miller
ATTORNEY

United States Patent Office 3,071,182
Patented Jan. 1, 1963

3,071,182
COMPACT FUEL BURNER WITH ELECTRIC IGNITION MEANS
James K. Delano, Rye, N.Y.; Arthur G. Steinmetz, administrator of said James K. Delano, deceased, assignor to James K. Delano
Filed Feb. 3, 1960, Ser. No. 6,438
13 Claims. (Cl. 158—28)

The present invention relates to a small, compact fuel burner for supplying heat and which will operate with high efficiency on a variety of domestic fuels. The burner constructed in accordance with the present invention may be used effectively in space heating units, heat transfer types such as domestic hot water heaters and may be incorporated in convecting enclosures as the heating unit for certain types of hot air furnaces. In addition, the present fuel burner may be used in portable stoves. Other uses for the present device will become apparent hereinafter, therefore, the above enumeration of uses should not in any way be considered restricting.

It is an object of the present invention to provide a small compact fuel burner which is easily adaptable to various applications whereby its heat is utilized most efficiently.

It is a further object of the present invention to provide a compact fuel burner which will burn with high efficiency any of the domestic fuels, such as benzene, high or low octane gasolines, various grades of kerosene, light distillates and diesel oil. The fuel burner will burn its fuel clean without forming carbon deposits in the burner and without visible smoke. Moreover, the fuel burner burns the fuel at an extremely low rate of fuel consumption in a continuous operation and without requiring attention. The present invention may be used in a multiplicity of applications, for example, the heating of garages, cottages, camps, boats, trailers, buses as well as in commercial applications, such as installations to keep pipe lines open and machinery and engines operating at sub-zero temperatures.

It is another object of the present invention to provide a small, compact fuel burner which requires no preheating, gasifying or priming of the fuel to produce vaporization for burning. The parts where the fuel-air combination mixes as well as the fuel inlet parts are designed to be kept cool and well below any distillation point of the fuel. This is important since heretofore whenever fuel was distilled into a gas, carbon deposits were formed as a residue which in time clogged the burner and changed the conditions necessary for perfect combustion; causing loss of heat, smoking, soot, etc.

It is another object of the present invention to provide a fuel burner system incorporating a forced air blower means and a thermostatic control of the ignition circuit.

It is still another object of the present invention to provide for a common motor driving both said fuel oil pump and the forced air blower.

The actual combustion of the fuel in the present invention takes place in a circular non-metallic porous tube in the outlet end or nozzle of the burner which reaches a high temperature maintained by the flame of combustion and by the absorption of fuel in its pores and burns as surface combustion. The passing of the fuel-air mixture through this hot zone in the tube which is over 1600° F. causes the fuel to crack and vaporize into gas. The change from fuel to gas is done "in situ" in the flame of the combustion itself, the flame being confined in its passage through the nozzle which is maintained at high temperature by the burning gas-air mixture, will also consume any residue that might strike its heated surface. By this method of vaporizing the fuel within the flame of its own combustion, there are no deposits that require constant cleaning of the burner parts to maintain efficiency.

The above and other features, objects and advantages of the present invention will be fully understood from the following description considered in connection with the accompanying illustrative drawings.

Figure 2:
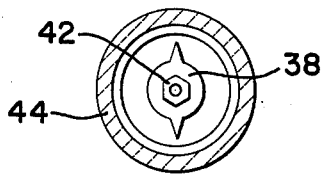
Figure 4:
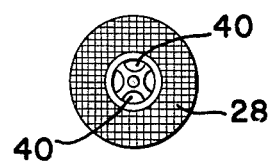
Figure 3:
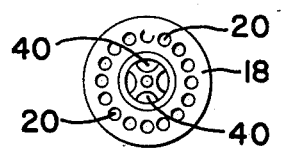
Figure 5:
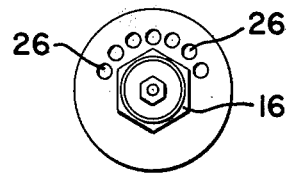
Figure 8:
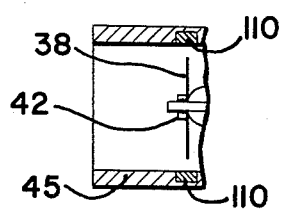
Figure 6:
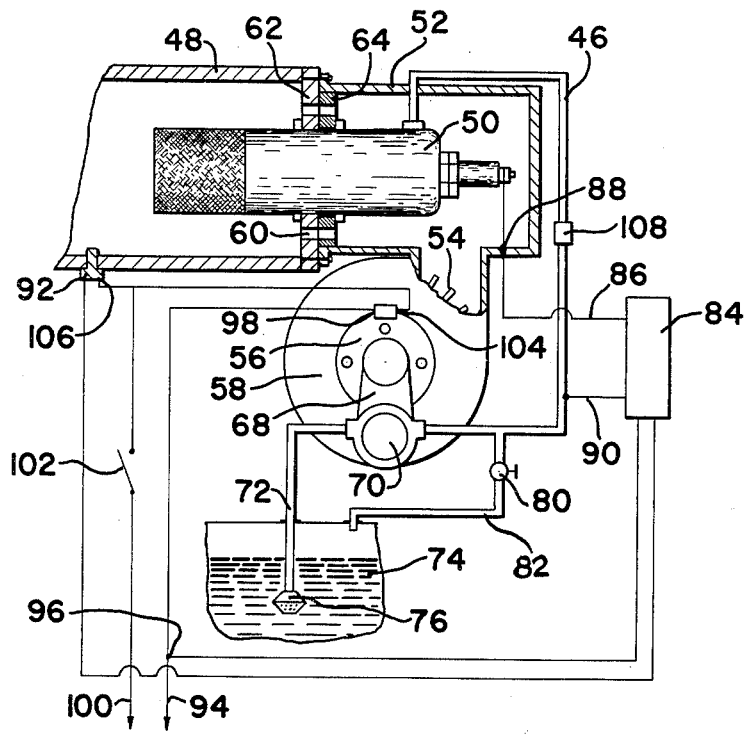
Figure 7:
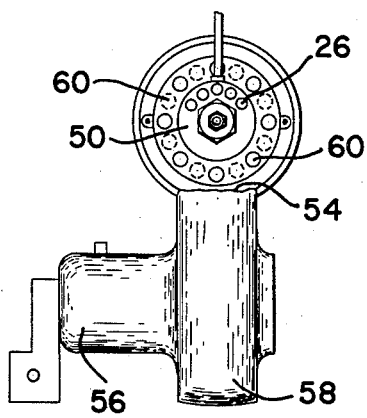

FIG. 1 is a sectional view of the burner unit embodying the teachings of my invention, FIG. 2 is a sectional view taken along lines 2—2 of FIG. 1, FIG. 3 is a sectional view taken along the lines 3—3 of FIG. 1, FIG. 4 is a sectional view taken along the lines 4—4 of FIG. 1, FIG. 5 is a view taken along the lines 5—5 of FIG. 1, FIG. 6 is a partial elevation, sectional and diagrammatic view of the entire compact fuel burner assembly constructed in accordance with the present invention, FIG. 7 is a partial end view of the fuel burner shown in FIG. 6, and FIG. 8 is a view similar to FIG. 1 but illustrating a modification thereof.

Referring more particularly to the drawings and especially to FIGS. 1-5, wherein is illustrated an outer metal tube 10, open at the front end and partly closed at the back end. Positioned centrally within outer tube 10 in spaced relationship therewith is an inner metal tube 12 having the rear end projecting beyond the back end of the outer tube 10 and having a portion thereof threaded at 14 in the complementary tapped portion of outer tube 10. Lock nuts 16 are removably screwed on the threaded portion 14 of the inner tube 12 and drawn up tight against the back end of outer tube 10 to thereby securely hold the inner tube 12 within the outer tube 10.

Located on the outside diameter of the inner tube preferably with a drive fit are annular discs 18 having a plurality of circumferentially arranged holes 20 (see FIG. 3). The discs 18 fit snugly against the inside bore of outer tube 10. Each of the holes 20 preferably have a diameter of approximately $\frac{1}{16}''$. The disc 18 at the extreme right of FIG. 1 forms one boundary for a chamber 22. The chamber 22 is provided with an opening 24 into which a fuel supply pipe 46 is inserted. In addition, a multiplicity of air inlet holes 26 are formed in the upper half of the rear wall of the outer tube 10 which permit forced air to enter the chamber 22 (see FIG. 7). Between the discs 18 are positioned a number of annular screens 28 constituted of fine screen mesh as clearly seen in FIGS. 1 and 4. The disc 18 at the extreme left of FIG. 1 is permanently secured in position by brazing or staking. It should be noted that the assembly of discs 18 and screens 28 may be accomplished on the inner tube 12 removed from the structure, and thereafter the assembly inserted in the bore of outer tube 10. The assembly of discs and screens thereby forms a labyrinth through which the air-fuel mixture is passed and forms a mixing device to break up the fuel and air under blower pressure into an intimate mixture.

A porcelain tube 30 having an enlarged end or boss 32 extends through the bore of the inner metal tube 12 and projects rearwardly at 31 about ⅝ inch beyond lock nuts 16. A porcelain collar 34 fits over the rearward projection 31 and a conductive rod 36 fits in the bore of porcelain tube 30. At the forward end of rod 36 is an ignition device which may take the form of a washer or electrode 38. The ignition electrode 38 is positioned substantially perpendicular to the longitudinal axis of the porcelain tube 30. Extending along the length of porcelain tube 30 are longitudinal flutings 40. One end of each of the flutings 40 is adjacent to the ignition washer 38 while the other end of the fluting is adjacent to air inlet holes 27 in tube part 31. The ignition electrode 38 is held in place by means of a threaded nut 42. The tube 30 should be fairly free in inner tube 12 to permit expansion and contraction of the same. The ignition washer 38 is preferably constituted of ZR metal. It should be noted that the flutings 40 extend along the entire length of the porcelain rod 30. They serve the purpose first of supplying air under blower pressure directly to the center of the fire at the burner head and second to keep the porcelain rod and inner tube 12 cool. Thus, the combustion air propelled by the blower through the flutings 40 is supplied directly to the center of combustion and results in an extremely hot fire.

A nozzle 44 which is preferably a porous carbon or porous filter type of ceramic nozzle material is clearly shown in FIG. 1. Nozzle 44, on the other hand, may be constituted of any material which is capable of being saturated by fuel and is non-destructible by fire. It should be noted that a portion of the nozzle 44 extends slightly past the sparking ignition electrode 38 so that the ignition spark must jump to ground through a part of the nozzle 44 which is adjacent thereto. The ground return is through the outer tube 10 and supply line 46. In addition, it should be noted that the sparks from ignition electrode 38 jump through the nozzle 44 wetted by fuel and to the nearest ground.

FIGS. 6 and 7 illustrate the entire assembly in which the burner unit is mounted in a firebox 48 of a furnace or boiler. It should be noted that the rear portion 50 of the burner unit projects out of the firebox 48 and is located in an enclosure or air chamber 52. The air chamber 52 completely surrounds the rear portion 50 of the burner unit. Thus, the portion of the burner unit which contains the discs 18 and the screens 28 are outside the firebox 48 and thereby will not be subjected to the interior heat of the firebox.

The air chamber 52 is connected to a blower fan 54 which is driven by an electric motor 56. Reference number 58 refers to the enclosure for fan 54. The latter supplies air under a few pounds pressure to the burner holes 60 into the chamber 22 of the burner unit as well as to inlet holes 26 and 27. Air under pressure is also supplied by fan 54 to the firebox 48 through apertured wall 62 and apertured, rotatable plate 64. The latter is adjustable so that when the two sets of apertures are aligned there is full air admission to the firebox 48.

Attached to one end of motor 56 is a reduction gear box 68 for reducing the speed of fuel pump 70 which is connected by a pipe 72 to the tank 74 which supplies the burner unit with fuel through strainer 76 to burner supply line 46. An adjustable by-pass pressure relief valve 80 is connected to supply line 82 and keeps a constant pressure in the line at the inlet to the burner unit, the excess fuel being returned to tank 74 by means of line 82.

A vibrating ignition coil 84 has its high voltage line 86 connected to electrode 36 of the burner unit passing through a rubber bushing 88 in the air chamber 52, the other end of the high voltage winding being grounded at 90. The ignition coil 84 has one electrical line connected to the thermostat 92 which when heated opens the circuit. The other electrical line is connected to the main 94 at 96 and also connects to one terminal of the electric motor 56 at 98. The other main 100 is connected through the operating switch 102 to the other terminal 104 of the motor 56 and to the thermostat 92 at 106. A fuel filter 108 is placed in line 78 with a fine screen mesh to prevent any sediment from the tank from passing to the burner unit.

FIG. 8 illustrates an alternative construction of the front end of the burner unit in which the ignition electrode 38 is located adjacent to a magnesia pellet insert 110 embedded in metal nozzle 45. It should be noted that the nozzle may also be constructed of any fibrous material which is non-destructible by fire. Such a construction is shown by nozzle 44 of FIG. 1.

The operation is as follows: current is supplied to mains 94—100. The current may be 6—12—32 or 110 D.C. or A.C. depending on requirements. It is understood that the motor and ignition coil, etc. will be wound for the selected voltage. Assuming fuel in the tank, switch 102 is closed, motor 56 drives blower fan placing air pressure in air chamber, fuel pump supplies fuel to lines and into burner space chamber 22, the thermostat being closed thereby supplying current to the ignition coil primary, high voltage from the secondary circuit being fed to the center rod in porcelain insulating tube 30 via wire 86. The ignition electrode 38 having the shortest path to return to ground 90 will allow the high voltage to discharge inside of the outlet nozzle either to it or if of porous insulating material through it to the metal tube at 90, the spark following the connecting pores, if of the ceramic type, to ground. The compressed air in the chamber 22 around the fuel inlet carries the drops of fuel from the fuel supply pipe 46 through a disc 18 and multiple packed screens 28. There the air and fuel pass through the screens' barriers and are intimately mixed together and forced out by the incoming air-oil under blower's pressure through the holes in the second disc 18 in form of spray, not a fog or mist, but a wet spray. As this passes the burner nozzle it saturates the porous substance like a sponge. The electric spark ignites the fuel and as the mixture begins to burn the nozzle becomes increasingly heated until the body of the nozzle reaches a glow temperature, the extreme end giving out radiant heat. The passage of the spray mixture through the confined space causes the fuel particles to burn completely in the presence of the air flow. The operating heat of the nozzle completely burns out any deposit of soot or carbon which might accumulate in its pores or on its surface. The ignition sparking takes place before the surface is wetted, when the nozzle begins to receive its supply of fuel it ignites, and due to the amount of air present does not produce visible smoke even when starting cold, nor during the warm-up time. As soon as the heat is up to maximum the firebox 48 becomes hot and the ignition circuit is opened by the thermostat 92. The nozzle being kept above ignition temperature continuously supports combustion. The incoming air through the holes 26 27 and 60 in rear and upper part of the burner unit together with the fuel will prevent the discs and mixing screens from reaching a temperature that would cause distillation deposits which would soon clog up the staggered passages through the multiple layers of screens. The holes in disc 18 shown in FIG. 3 are small enough together with the screens to prevent any flame reaching the fuel chamber 22 in case of a back fire in the burner. The air supply holes 26 shown in FIG. 5 are of sufficient size to allow full blower air pressure to enter the fuel chamber.

In selecting the nozzle material, if carbon, the preferred type is that with open grain, hard and porous, somewhat like oven coke but not burnable like coke in the heat developed at the nozzle. It must be absorbent as to its pores and porous enough to act as a sieve or filter as a certain amount of fuel is absorbed and burns from the surface of the nozzle as surface combustion. The same applies to ceramic types. It is important, however, that in this type the lattice of the pores be open so the ignition spark can jump to ground through the lattices. Ceramics of most kinds are good insulators and it is important that the spark can get through the open pores to ground to allow ignition of the fuel lodged in them. While the vapors of gasoline will ignite readily by a spark it is another matter to ignite lower fuels such as kerosene, distillate fuel oil, etc. as these fuels have very low volatility when cold. In order to ignite these fuels with a spark discharge requires more than that the spark impinge on a surface that is wet with the fuel. At the point of discharge, there should be a substance whose surface will be heated enough by the sparking to vaporize the fuel in a small area. When this takes place the vapor will ignite and the resulting heat will produce a continuous vaporization and the fuel will consequently ignite. The carbon as indicated does just this, the spark striking the hard open grain surface causing a hot spot to form on the surface and form vapor which ignites readily.

The ceramic nozzle operates somewhat differently. The ceramic being porous is wetted by the fuel and being an insulator the spark does not form a hot spot but goes through the pores to ground. The ceramic is also a good heat insulator so the spark heats the absorbed fuel during its passage through the ceramic wall to ground. There are many porous filters of different types of powdered metals, iron, copper, stainless steel, etc. that have all the qualities for apparent successful operation, but fail to ignite as they, being metal, completely absorb the heat of the spark and give poor results. However, I have had successful results with ignition by inserting in a porous metal nozzle 45 opposite the point of discharge of the ignition electrode 38 fibrous pellets of magnesia material 110 as shown in FIG. 8 which when wet with fuel readily ignite as the spark passes through them to ground. I do not wish to be limited to the substances disclosed, there may be others that will act the same by using spark ignition, also no doubt that if enough energy is supplied by a high voltage power transformer that produces an arc instead of a spark that ignition could be accomplished, with other types of porous nozzles. I have included the use of ordinary vibrating spark coil for the purpose of describing the operation. Also by the use of low voltage battery current for the coil and the blower motor, controls, etc., the burner will have available a broader field of uses. I have not gone into detail as to mechanism of the fuel pump, the reducing gearing for the pump, the motor or blower, relief valve, thermostat, ignition coil, filter, etc. as these parts are well known and are indicated to only complete the disclosure.

From the foregoing description it is evident that the air-fuel supply to the burner as indicated in FIG. 6 is self regulating. For battery operation this is important as a battery is usually high in voltage when fully charged and lower as it is discharging, and unless the fuel-air ratio is maintained the combustion might suffer. The driving of the blower air supply and the driving of the fuel pump from the same motor ties them together since if the motor speeds up the air pressure is increased as well as the fuel, the ratio being the same and vice versa if speed is lowered so the only difference is higher and lower heating, the air-fuel remaining in a fixed ratio. The burner described is made of materials that are poor conductors of heat, such as the stainless types of steel as they do not transmit heat readily and do not corrode easily. Furthermore effective cooling is maintained by the passage of air into the inlets of the burner by the blower and heat is absorbed by the auxiliary air openings in firewall through which the burner is mounted. While this described type of burner is for use primarily for small heating units, however, I do not wish to be confined to any specific size.

The burner described has certain specific advantages as follows: It does not require fuel or air under high pressure to create fog mixture for combustion. It does not require any special fuel jet to form a mixture of air-fuel that can be plugged by tank sediments or gels in the fuel. It will burn various types fuels ranging from 67 to 32 gravity A.P.I. that will gasify passing through the heat of the combustion nozzle equally well, and burn without visible smoke due to complete combustion. It will not form carbon in its parts and is kept clean continuously by passage of cool fuel-air through them. It starts when installed in a heating system without preheating or priming by closing of a switch. It also lends itself to various types of controls for automatic and safe operation.

It should be noted that if fuel pump 70 is operated at the proper pumping speed then the by-pass line 82 with its pressure relief valve 80 is unnecessary, however, since the speed of the pump may vary a by-pass line is required in order to keep a constant pressure in the line at the inlet to the burner.

What I claim is:

1. A fuel burner heating unit comprising an outer tube with a perforated rear wall for the admission of air therethrough, an inner tube secured co-axially in said outer tube, an assembly for intimately mixing the fuel and the air being located between said outer and inner tubes, a chamber situated between said assembly and rear wall, a fuel supply pipe communicating with said chamber for supplying fuel thereto, conductive means in said inner tube having a spark ignition electrode thereon which is located beyond the end of said inner tube remote from the rear wall of said outer tube, means in said heating unit whereby air is conducted directly to the center of combustion of said heating unit, a nozzle of a porous refractory material capable of being substantially saturated by said fuel and nondestructible by fire affixed to the front of said outer tube in a manner whereby the electric sparks from the ignition electrode are conducted to the outer tube through a portion of said nozzle, the fuel supplied to said chamber being combined with said air, said fuel-air combination being intimately mixed in said assembly, and means propelling said fuel-air combination into the front of said fuel burner heating unit and substantially saturating said nozzle whereby said electric sparks ignite said fuel-air combination in said nozzle in the vicinity of said ignition electrode.

2. A fuel burner heating unit as set forth in claim 1 further comprising a current source, an ignition circuit electrically connecting said current source with said ignition electrode and having its return ground through said outer tube, a thermostat being acted upon by the heat of combustion of said fuel burner heating unit whereby upon the occurrence of a predetermined temperature said ignition circuit is opened.

3. A fuel burner heating unit comprising an outer tube with a perforated rear wall, an inner tube secured co-axially in said outer tube, a plurality of screens and discs mounted on said inner tube and snugly abutting a part of the inner peripheral surface of said outer tube, said screens and discs having a plurality of apertures therein, the number of apertures of said screens and discs being different, said screens and discs being so positioned on said inner tube that a chamber remains between said screens and discs and the rear wall of said outer tube, a fuel supply pipe communicating with said chamber, conductive means in said inner tube having a spark ignition electrode thereon which is located beyond the end of said inner tube remote from the rear wall of said outer tube, means in said heating unit whereby air is conducted directly to the center of combustion of said heating unit, a nozzle of a porous refractory material capable of being substantially saturated by fuel and non-destructible by fire affixed to the front of said outer tube in a manner whereby at least some of the electric sparks from the ignition electrode are conducted to the outer tube through a portion of said nozzle, said fuel supplied to said chamber being combined with air passing through the perforations of said rear wall, said fuel-air combination being intimately mixed in said apertured screens and discs, means propelling said fuel-air combination into the front of said fuel burner heating unit and saturating said nozzle whereby said electric sparks ignite said fuel-air combination in said nozzle and in the vicinity of said ignition electrode.

4. A fuel burner heating unit comprising an outer tube with a perforated rear wall, an inner tube secured co-axially in said outer tube, a plurality of screens and discs mounted on said inner tube and snugly abutting a part of the inner peripheral surface of said outer tube, said screens and discs having a plurality of apertures therein, the number of apertures of said screens and discs being different, said screens and discs being so positioned on said inner tube that a chamber remains between said screens and discs and the rear wall of said outer tube, a fuel supply pipe communicating with said chamber, conductive means in said inner tube having a spark ignition electrode thereon which is located beyond the end of said inner tube remote from the rear wall of said outer tube, a nozzle of a porous refractory material capable of being substantially saturated by fuel and non-destructible by fire affixed to the front of said outer tube is a manner whereby at least some of the electric sparks from the ignition electrode are conducted to the outer tube through a portion of said nozzle, said inner tube being provided with longitudinal fluting for the circulation of air, means for supplying air through said fluting directly to the center of combustion of said heating unit, and fuel supplied to said chamber being mixed with air passing through the perforations of said rear wall, said fuel-air combination being intimately mixed in said apertured screens and discs, and means propelling said fuel-air combination into the front of said fuel burner heating unit and saturating said nozzle whereby said electric sparks ignite said fuel-air combination in said nozzle and in the vicinity of said ignition electrode.

5. A fuel burner heating unit comprising an outer tube with a perforated rear wall, an inner tube secured co-axially in said outer tube, a plurality of annular screens and discs mounted on said inner tube and snugly abutting a part of the inner peripheral surface of said outer tube, said screens and discs having a plurality of apertures therein, the number of apertures of said screens and discs being different, said screens and discs being so positioned on said inner tube that a chamber remains between said screens and discs and the rear wall of said outer tube, a fuel supply pipe communicating with said chamber, means in said inner tube including a hollow porcelain tube having a rod-like electrode therein having an ignition washer at one end thereof, said rod-like electrode extending beyond the end of said inner tube remote from the rear wall of said outer and having said washer attached to the free end thereof, means in said heating unit whereby air is conducted directly to the center of combustion of said heating unit, a porous, refractory ceramic nozzle affixed to the front of said outer tube in a manner whereby the electric sparks from the ignition washer are conducted to the outer tube through a portion of said ceramic nozzle, and fuel supplied to said chamber is combined with air passing through the perforations of said rear wall, said fuel-air combination being intimately mixed in said annular, apertured screens and discs, and means propelling said fuel-air combination into the front of said fuel burner heating unit, and saturating said ceramic nozzle whereby said electric sparks ignite said fuel-air combination in said ceramic nozzle and in the vicinity of said ignition washer.

6. A fuel burner heating unit comprising an outer tube with a perforated rear wall, an inner tube secured co-axially in said outer tube, a plurality of annular screens and discs mounted on said inner tube and snugly abutting a part of the inner peripheral surface of said outer tube, said screens and discs having a plurality of apertures therein, the apertures of said screens and discs being of different sizes, said screens and discs being so positioned on said inner tube that a chamber remains between said screens and discs and the rear wall of said outer tube, a fuel supply pipe communicating with said chamber, conductive means in said inner tube having a spark ignition electrode thereon which is located beyond the end of said inner tube remote from the rear wall of said outer tube, and a porous, refractory ceramic nozzle affixed to the front of said outer tube in a manner whereby the electric sparks from the ignition electrode are conducted to the outer tube through a portion of said ceramic nozzle, said inner tube being provided with longitudinal fluting extending to said ignition electrode, a firebox enclosing said outer and inner tubes with the exception of the portion of said tubes having said screens and discs engaging therewith, adjustable openings in said firebox, blower means for circulating air through said perforations, openings and longitudinal fluting, and fuel supplied to said chamber is combined with air passing through the perforations of said rear wall, said fuel-air combination being intimately mixed in said annular, apertured screens and discs and propelled by said blower means into the front of said fuel burner heating unit and saturating said ceramic nozzle whereby said electric sparks ignite said fuel-air mixture in said ceramic nozzle and in the vicinity of said ignition electrode.

7. A fuel burner heating unit as set forth in claim 6 further comprising an air chamber closure surrounding a part of the tubes of said fuel burner heating unit, said circulated air being conducted from said blower means to said air chamber.

8. A fuel burner heating unit comprising an outer tube with a perforated rear wall, an inner tube secured co-axially in said outer tube, a plurality of annular screens and discs mounted on said inner tube and snugly abutting a part of the inner peripheral surface of said outer tube, said screens and discs having a plurality of apertures therein, the apertures of said screens and discs being of different sizes, said screens and discs being so positioned on said inner tube that a chamber remains between said screens and discs and the rear wall of said outer tube, a fuel supply pipe communicating with said chamber, conductive means in said inner tube including a spark ignition electrode thereon which is located beyond the end of said inner tube remote from the rear wall of said outer tube, means in said heating unit whereby air is conducted directly to the center of combustion of said heating unit, a fibrous refractory nozzle capable of being saturated by fuel and non-destructible by fire affixed to the front of said outer tube in a manner whereby the electric sparks from the ignition electrode are conducted to the outer tube through a portion of said nozzle, and fuel supplied to said chamber is mixed with air passing through the perforations of said rear wall, said fuel-air combination being intimately mixed in said annular, apertured screens and discs, and blower means propelling said fuel-air combination into the front of said fuel burner heating unit and saturating said nozzle whereby said electric sparks ignite said fuel-air combination in said nozzle and in the vicinity of said ignition electrode, a pump connected to said fuel supply pipe, and a common motor for driving said blower means and said pump.

9. A fuel burner heating unit comprising a metal outer tube with a perforated rear wall for the admission of air, a metal inner tube secured co-axially in said outer tube, an assembly for intimately mixing the fuel and the air being located between said outer and inner tubes, a chamber situated between said assembly and rear wall, a fuel supply pipe communicating with said chamber, conductive means in said inner tube having a spark ignition electrode thereon which is located beyond the end of said inner tube remote from the rear wall of said outer tube, means in said heating unit whereby air is conducted directly to the center of combustion of said heating unit, a porous, refractory ceramic nozzle affixed to the front of said outer tube in a manner whereby the electric sparks from the ignition electrode are conducted to the outer tube through a portion of said ceramic nozzle, and fuel supplied to said chamber is combined with air passing through the perforations of said rear wall, said fuel-air combination being intimately mixed in said assembly, and means propelling said fuel-air combination into the front of said fuel burner heating unit and saturating said ceramic nozzle whereby said electric sparks ignite said fuel-air mixture in said ceramic nozzle and in the vicinity of said ignition electrode.

10. A method of burning high and medium oil fuels in a fuel burner heating unit having a spark ignition electrode attached to the forward end of a conductive rod which is surrounded by flutings of insulated material, and an outer porous refractory nozzle secured to a metal outer member, said metal outer member being provided with openings therein, a firebox enclosing said heating unit and having apertures therein; comprising the steps of supplying oil fuel to said metal outer member mixing a stream of primary air propelled through the openings in said metal outer member with the oil fuel to form a burnable mixture, igniting said mixture by creating sparks at a location between said electrode and said porous refractory nozzle whereby the sparks from said electrode are grounded to said metal outer member, and introducing secondary air through said flutings directly into said burning mixture to increase the heat of combustion and thereby form a heat zone sufficiently high in temperature to cause vaporization of the oil suspended in the air stream and create gas from the flow of said mixture into said heat zone, and supplying tertiary air through the apertures in said firebox.

11. A fuel burner heating unit comprising an outer tube with a rear wall having apertures therein, an inner tube secured co-axially in said outer tube, a plurality of annular screens and discs mounted on said inner tube and snugly abutting a part of the inner peripheral surface of said outer tube, a number of screens being constituted of a fine screen mesh, said discs having a plurality of apertures circumferentially arranged therein, the number of apertures of said screens and discs being different, said screens and discs being so positioned on said inner tube that a chamber remains between said screens and discs and the rear wall of said outer tube, a fuel supply pipe communicating with said chamber, conductive means in said inner tube having a spark ignition electrode thereon which is located beyond the end of said inner tube remote from the rear wall of said outer tube, means in said heating unit whereby air is conducted directly to the center of combustion of said heating unit, a porous, refractory ceramic nozzle affixed to the front of said outer tube in a manner whereby electric sparks from the ignition electrode are conducted to the outer tube through a portion of said ceramic nozzle, and fuel supplied to said chamber being combined with air passing through the perforations of said rear wall, said fuel-air combination being intimately mixed in said apertured screens and discs, and means propelling said fuel-air combination into the front of said fuel burner heating unit and saturating said ceramic nozzle whereby said electric sparks ignite said fuel-air combination in said ceramic nozzle and in the vicinity of said ignition electrode.

12. A fuel burner heating unit comprising a metal outer tube and a perforated rear wall, a metal nozzle attached to the front of said outer tube and having a recess in said metal nozzle, a magnesia pellet inserted in said recess, a metal inner tube secured co-axially in said outer tube, a plurality of annular screens and discs mounted on said inner tube and snugly abutting a part of the inner peripheral surface of said outer tube, said screens and discs having a plurality of apertures therein, the apertures of said screens and discs being of different sizes, said screens and discs being so positioned on said inner tube that a chamber remains between said screens and discs and the rear wall of said outer tube, a fuel supply pipe communicating with said chamber, conductive means in said inner tube having a spark ignition electrode thereon which is located beyond the end of said inner tube remote from the rear wall of said outer tube, means in said heating unit whereby raw atmospheric air is conducted directly to said ignition electrode, said metal nozzle being affixed to the front of said outer tube in a manner whereby at least some of the electric sparks from the ignition electrode are conducted to said nozzle through said magnesia pellet, and fuel supplied to said chamber is mixed with air passing through the perforations of said rear wall, said fuel-air combination being intimately mixed in said annular apertured screens and discs, and means propelling said fuel-air combination into the front of said fuel burner heating unit and saturating said magnesia pellet whereby said electrode sparks ignite said fuel-air combination in said magnesia pellet and in the vicinity of said ignition electrode.

13. A fuel burner heating unit comprising an outer tube with a perforated rear wall, an inner tube secured co-axially in said outer tube, a plurality of annular screens and discs mounted on said inner tube and snugly abutting a part of the inner peripheral surface of said outer tube, said screens and discs having a plurality of apertures therein, the apertures of said screens and discs being of different sizes, said screens and discs being so positioned on said inner tube that a chamber remains between said screens and discs and the rear wall of said outer tube, a firebox enclosing said outer and inner tubes with the exception of the portion of said tubes having said screens and discs engaging therewith, said firebox having a perforated rear wall, means for adjusting the perforations in the firebox rear wall, a fuel supply pipe communicating with said chamber, the fuel being confined in its passage between said outer and inner tubes, conductive means in said inner tube having a spark ignition electrode thereon which is located beyond the end of said inner tube remote from the rear wall of said outer tube and substantially perpendicular to said tubes, means in said heating unit whereby air is conducted directly to the center of combustion of said heating unit, a porous, refractory ceramic nozzle affixed to the front of said outer tube in a manner whereby the electric sparks from the ignition electrode are conducted to the outer tube through a portion of said ceramic nozzle, and fuel supplied to said chamber is combined with air passing through the perforations of said rear wall, said fuel-air combination being intimately mixed in said annular apertured screens and discs and means propelling said fuel-air combination into the front of said fuel burner heating unit and saturating said ceramic nozzle whereby said electric sparks ignite said fuel-air combination in said ceramic nozzle and in the vicinity of said ignition electrode.

References Cited in the file of this patent

UNITED STATES PATENTS

| | | |
|---|---|---|
| 980,801 | Kraus | Jan. 2, 1911 |
| 2,021,407 | Erickson | Nov. 19, 1935 |
| 2,194,081 | Bock | Mar. 19, 1940 |
| 2,309,319 | Johnston | Jan. 26, 1943 |
| 2,411,040 | Holthouse | Nov. 12, 1946 |
| 2,712,352 | Manor et al. | July 5, 1955 |